July 20, 1943.      O. E. SIMMONDS      2,324,731
SELF-LOCKING NUT AND LIKE INTERNALLY SCREW-THREADED MEMBERS
Filed Dec. 21, 1939

Inventor
Oliver E. Simmonds
By
Watson, Cole, Grindle & Watson
Attorneys

Patented July 20, 1943

2,324,731

UNITED STATES PATENT OFFICE 2,324,731

SELF-LOCKING NUT AND LIKE INTERNALLY SCREW-THREADED MEMBER

Oliver Edwin Simmonds, Ripley, England

Application December 21, 1939, Serial No. 310,444
In Great Britain December 31, 1938

9 Claims. (Cl. 151—14)

This invention relates to self-locking nuts and like internally screw-threaded members, hereinafter referred to as a nut, and has for its object to provide an improved form of nut which is effectively locked to a bolt or like externally screw-threaded member, hereinafter referred to as a bolt, against unintentional slackening due to shocks or vibration, even after repeated removal of the nut from a bolt. A further object of the invention is the provision of a method of making a self-locking nut.

The invention will be described with reference to the accompanying drawing, in which like reference numerals denote like parts, and in which.

Figure 1:
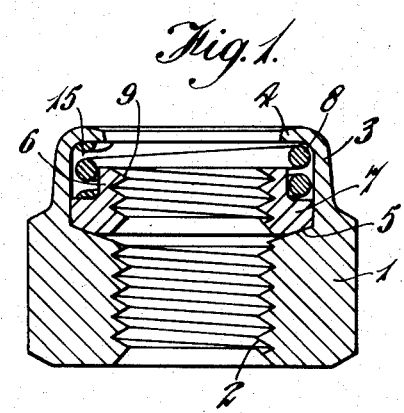
Figure 1 is a vertical section taken on the line 1—1 of Figure 2.
Figure 3:
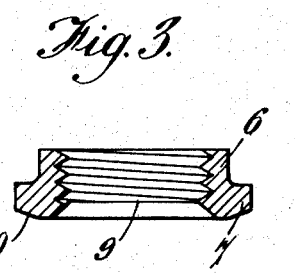
Figure 3 is a central vertical section of the block shown in Figure 1, taken on the line 3—3 of Figure 4.
Figure 4:
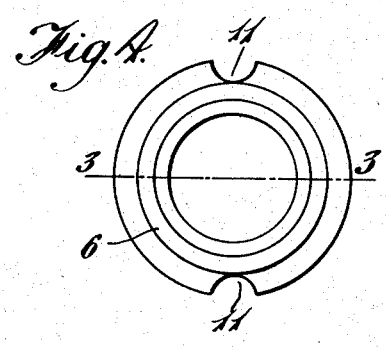
Figure 4 is a top plan view of the block shown in Figure 3.
Figure 2:
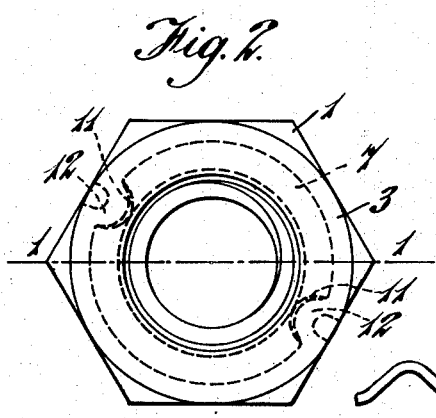
Figure 2 is a top plan view of the nut shown in Figure 1.
Figure 7:
Figure 7 is a detailed view of the spring shown in Figure 5, the spring being shown extended.

Referring first to Figures 1 to 4 of the drawing, the nut body 1 is provided with a screw-threaded bore 2 and has a recess 15 at one end thereof formed by the tubular extension 3 having the inturned edge portion 4. In the form illustrated in the drawing, the nut body is of the usual hexagonal shape and the inner wall of the tubular extension 3 is cylindrical. The external shape of the nut body 1 and the internal and external configuration of the tubular extension 3 may, however, take other desired forms. Housed within the recess 15 is a block 6 having a corresponding screw-threaded bore 9 and a laterally-extending projection in the form of an annular flange 7 at the inner end thereof. The nut body and the block may be constructed of any suitable metal and the flange 7 is a sliding fit in the recess 15 so that the block is maintained in axial alignment with the nut body 1. The end wall 5 of the recess 15 is conical and forms a seating for the block 6, the bottom of the flange being formed with a corresponding conical surface 10. Between the flange 7 of the block and the inturned edge portion 4 of the tubular extension 3 there is housed a helical spring 8, said inturned edge portion 4 forming an abutment for the spring. The block 6 is keyed to the nut body 1 against relative rotary movement in any suitable manner and in such a position that its threads are out of pitch with the threads of the nut body. In the nut shown in the drawing, the flange 7 of the block 6 is formed with diametrically opposite peripheral keyways 11 extending from the bottom to the top of the flange, such keyways being engaged by corresponding diametrically opposite keys 12 extending inwardly from the tubular wall 3.

The action of the nut is as follows. The threads of the block being out of helical alignment with the threads of the nut body, the end of a bolt, as it advances into the nut, moves the block axially away from the nut body until the threads of the nut body and block are in helical alignment, when the bolt can advance through the bolck. Due to the axial movement of the block, the spring is compressed between the flange 7 and the inturned edge portion 4 of the tubular extension 3 and urges the bolt axially downwards, adjacent threads of the bolt and nut being thereby urged tightly together so that the nut is locked very effectively to the bolt.

Figure 5:
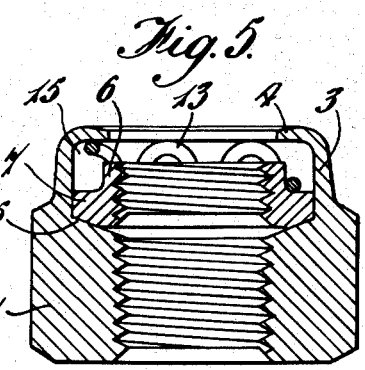

In the modified form of nut shown in Figure 5, the helical spring 8 of Figure 1 is replaced by a spring 13 in the form of corrugated metallic wire or strip, the corrugations of such wire or strip extending longitudinally. In other respects the nut shown in Figure 5 is identical with that shown in Figures 1 to 4 and the operation of the nut is similar. The nuts shown in Figures 1 to 5 are of all metal construction.

Figure 6:
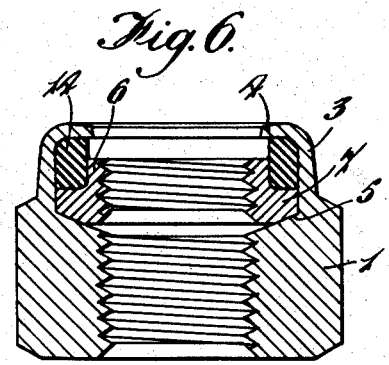
Figures 5 and 6 are views similar to Figure 1, showing modified forms of self-locking nuts in accordance with the invention.

In the nut shown in Figure 6 the resilient means housed between the flange 7 and the inturned portion 4 of the tubular extension 3 comprises a tube 14 of elastic material, for example, rubber or hard vulcanized fibre. The body portion of the block 6 fits snugly in the tube of elastic material which in turn snugly fits the recess in the nut, the block being thus maintained in axial alignment with the nut body. The action of this form of nut is similar to that of the nuts previously described.

The short tube of elastic material may, if desired, be arranged at the outer end of the block 6 instead of surrounding the block. In this case, the elastic material, when the nut is threaded on a bolt, is compressed between the outer end of the block and the inturned edge portion 4 of the tubular wall 3. The hole in the tube of elastic material may be of greater diameter than the maximum diameter of the screw-threaded shank of a bolt so that the bolt shank passes freely through it, or it may be made of less diameter than the maximum diameter of the screw-threaded bolt shank so that the bolt shank may be forced into such hole to impress its thread upon the elastic material, thereby effecting an additional locking of the nut to the bolt. Where necessary, means are provided to prevent relative rotary movement between the tube of elastic material and the nut body.

The self-locking nuts illustrated in the drawing may advantageously be made in the following manner. An apertured nut blank is first counter-bored to provide the recess 15 at one end thereof having a conical end wall 5, the axially-extending wall of the recess being formed with diametrically opposite keys 12, for example, by pressing inwardly part of the wall 3. A metal block 6 formed with the annular flange 7 having the diametrically opposite peripheral keyways 11 extending through the flange is then inserted within the recess 15 with the keys 12 engaging the keyways. The keys 12 and keyways 11 form a plurality of interengaging means such that the block may be keyed to the nut body against relative rotary movement in any one of a plurality of positions. Such interengaging means may take other forms. The nut blank and the block are then tapped with the block keyed to the nut blank, such tapping being commenced from the outer end of the block. After the tapping operation, the block is rotated 180° with respect to the nut body whereby the threads of the block are brought out of pitch with the threads of the nut body. In this position the block is reinserted in the nut recess with the keys 12 engaging the keyways 11, whereby the block is locked to the nut body in out-of-pitch relationship against relative rotary movement. The resilient means are then inserted in position in the nut recess and retained therein by turning inwardly the end portion 4 of the tubular wall 3. In the case where the resilient means comprises a helical spring, as in the nut shown in Figures 1 to 4, the end portion 4 of the tubular wall 3 is preferably slightly turned inwards before the insertion of the spring which may thereby be held in position during the final operation of turning inwardly the end portion 4.

In the nuts described above the threads of the block are 180° out of phase with the threads of the nut body. It will be understood, however, that the threads of the block may be more or less than 180° out of phase. The degree of helical misalignment and the strength or resiliency of the resilient means employed in the nut may be chosen to give any desired degree of locking.

The self-locking nuts of this invention are preferably of all-metal construction and, if desired, the block may be constructed of a metal different from that used for the nut body.

I claim:

1. A self-locking nut comprising a nut body having a screw-threaded bore, a tubular extension at one end of the nut body forming a recess, a block having a corresponding screw-threaded bore housed within said recess with its threads in axial alignment but out of pitch with the threads of the nut body, means preventing relative rotary movement between the block and nut body, and resilient means which is housed between abutment surfaces on said block and on said tubular extension, which acts to urge the block towards the nut body, and which is compressed between said abutment surfaces by relative axial movement of the block when a bolt is screwed into the nut body.

2. A self-locking nut comprising a nut body having a screw-threaded bore, a tubular extension at one end of the nut body having an inturned edge portion forming a recess, a block having a corresponding screw-threaded bore housed within said recess with its threads in axial alignment but out of pitch with the threads of the nut body, a laterally-extending projection on the inner end of said block, means preventing relative rotary movement between the block and nut body, and resilient means which is housed between said laterally-extending projection and the said inturned edge portion of the tubular extension, which acts to urge the block towards the nut body, and which, when the nut is threaded on to a bolt, is compressed between said edge portion and said projection by the relative axial movement of the block.

3. A self-locking nut comprising a nut body having a screw-threaded bore, a tubular extension at one end of the nut body having a cylindrical inner wall and an inturned edge portion forming a recess, a block having a corresponding screw-threaded bore housed within said recess with its threads in axial alignment but out of pitch with the threads of the nut body, an annular flange at the inner end of said block having a diameter substantially that of the said cylindrical wall of the recess, means preventing relative rotary movement between the block and nut body, and resilient means which is housed between said flange and the said inturned edge portion of the tubular extension, which acts to urge the block towards the nut body, and which, when the nut is threaded on to a bolt, is compressed between said edge portion and said flange by the relative axial movement of the block.

4. A self-locking nut according to claim 3, wherein a wall of said recess and the block have a plurality of interengaging means such that the block may be keyed to the nut body against relative rotary movement in any one of a plurality of positions.

5. A self-locking nut according to claim 3, wherein the resilient means comprises a helical spring.

6. A self-locking nut according to claim 3, wherein the resilient means comprises a spring in the form of a corrugated metallic strip.

7. A self-locking nut according to claim 3, wherein the resilient means comprises a tube of non-metallic material, part of the block extending into such tube.

8. A self-locking nut comprising a nut body having a screw-threaded bore, a tubular extension at one end of the nut body having a cylindrical inner wall and an inturned edge portion forming a recess, a block having a corresponding screw-threaded bore housed within said recess with its threads in axial alignment but out of pitch with the threads of the nut body, an annular flange at the inner end of said block having a diameter substantially that of the said cylindrical wall of the recess and having a plurality of diametrically opposite peripheral keyways open to the bottom of the flange, a plurality of diametrically opposite inwardly-extending keys on the said inner wall of the tubular extension engaging said keyways, and resilient means which is housed between said flange and the said inturned edge portion of the tubular extension and which, when the nut is threaded on to a bolt, is compressed between said edge portion and said flange by the relative axial movement of the block.

9. A self-locking nut comprising a nut body having a screw-threaded bore, a tubular extension at one end of the nut body forming a recess, a block having a corresponding screw-threaded bore housed within said recess with its threads in axial alignment but out of pitch with the threads of the nut body, means preventing relative rotary movement between the block and nut body, such means comprising a plurality of interengaging means on the block and a wall of said recess allowing the block to be keyed to the nut body against relative rotary movement in any one of a plurality of positions, and resilient means which is housed between abutment surfaces on said block and on said tubular extension, which acts to urge the block towards the nut body, and which is compressed between said abutment surfaces by relative axial movement of the block when a bolt is screwed into the nut body.

OLIVER EDWIN SIMMONDS.